(12) United States Patent
Cheng

(10) Patent No.: US 8,308,064 B2
(45) Date of Patent: Nov. 13, 2012

(54) BARCODE EVALUATION METHOD AND BARCODE EVALUATION APPARATUS

(75) Inventor: Ting-Yuan Cheng, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 111 days.

(21) Appl. No.: 13/044,500

(22) Filed: Mar. 9, 2011

(65) Prior Publication Data

US 2012/0085821 A1   Apr. 12, 2012

(30) Foreign Application Priority Data

Oct. 8, 2010   (TW) ................................ 99134347 A

(51) Int. Cl.
*G06K 7/00* (2006.01)
(52) U.S. Cl. .............. 235/436; 235/462.08; 235/462.16; 235/495; 235/462.01
(58) Field of Classification Search ............ 235/436, 235/462.01–462.45, 472.01–472.03, 454, 235/455, 495
See application file for complete search history.

(56) References Cited

U.S. PATENT DOCUMENTS

2010/0200658 A1 *  8/2010  Olmstead et al. ............. 235/455
* cited by examiner

*Primary Examiner* — Kristy A Haupt
(74) *Attorney, Agent, or Firm* — Winston Hsu; Scott Margo

(57) ABSTRACT

A barcode evaluation method for receiving an input image, performing an evaluation along a scanning direction upon the input image, and generating a barcode evaluation data includes: deriving at least one first luminance group in the input image according to a luminance threshold; documenting a plurality of characteristic values corresponding to the at least one luminance group, respectively; referring to a plurality of characteristic values of at least one specific first luminance group within the first luminance group to determine a distribution direction, and determining whether the specific first luminance group belongs to a barcode; and utilizing a processing element to generate the barcode evaluation data according to the input image, the distribution direction and the scanning direction.

22 Claims, 8 Drawing Sheets

BARCODE EVALUATION METHOD AND BARCODE EVALUATION APPARATUS

BACKGROUND OF THE INVENTION

1. Field of the Invention

The present invention relates to a barcode evaluation, and more particularly, to a barcode evaluation method and a barcode evaluation apparatus for scanning according to a barcode distribution direction.

2. Description of the Prior Art

In typical printing techniques, printed barcodes must meet a certain criteria, for example: a variation of a reflectance (i.e., luminance value) and a ripple, etc. of identification bars (i.e., black blocks and white blocks arranged alternately) in a barcode. In some printing techniques, the printing apparatus will evaluate a quality of a barcode after printing the barcode, and adjust some printing parameters according to the evaluation results such that a better printing quality can be obtained in the following barcode printing operation.

Typical printing apparatus, however, merely store all outputted images into a memory and analyze the pixels of stored images to derive the evaluation result; or the typical printing apparatus only performs an evaluation for a barcode of a specific distribution direction, once the distribution direction of a barcode is different from the predetermined direction, the barcode cannot be correctly evaluated. Therefore, conventional printing apparatus requires a huge amount of memory and calculation resource to perform evaluation for a printed barcode, in addition, when the distribution direction of the barcode is different from the predetermined direction, conventional printing apparatus fails to derive correct evaluation results.

Therefore, how to obtain correct evaluation results of a barcode having a distribution direction different from a scanning direction with less system resource has become a major problem to be solved.

SUMMARY OF THE INVENTION

In light of this, the present invention provides a barcode evaluation method and a related barcode evaluation apparatus for determining a distribution direction of a barcode within an input image, and processing the barcode properly according to the distribution direction to derive a barcode evaluation result.

According to an embodiment of the present invention, a barcode evaluation method is provided. The barcode evaluation method is for receiving an input image, performing an evaluation along a scanning direction upon the input image, and generating a barcode evaluation data, comprising: deriving at least one first luminance group in the input image according to a luminance threshold; documenting a plurality of characteristic values corresponding to the at least one luminance group, respectively; referring to a plurality of characteristic values of at least one specific first luminance group within the at least one first luminance group to determine a distribution direction, and determining whether the at least one specific first luminance group belongs to a barcode; and utilizing a processing element to generate the barcode evaluation data according to the input image, the distribution direction and the scanning direction.

According to another embodiment of the present invention, a barcode evaluation apparatus is provided. The barcode evaluation apparatus is for receiving an input image, performing an evaluation along a scanning direction upon the input image, and generating a barcode evaluation data, the barcode evaluation apparatus comprising a grouping element, a determining element and a processing element. The grouping element is coupled to the input image for deriving at least one first luminance group in the input image according to a luminance threshold, and documenting a plurality of characteristic values corresponding to the at least one luminance group, respectively. The determining element is coupled to the grouping element and configured for referring to a plurality of characteristic values of at least one specific first luminance group within the at least one first luminance group to determine a distribution direction, and determining whether the at least one specific first luminance group belongs to a barcode. The processing element is coupled to the determining element and the input image for generating the barcode evaluation data according to the input image, the distribution direction and the scanning direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
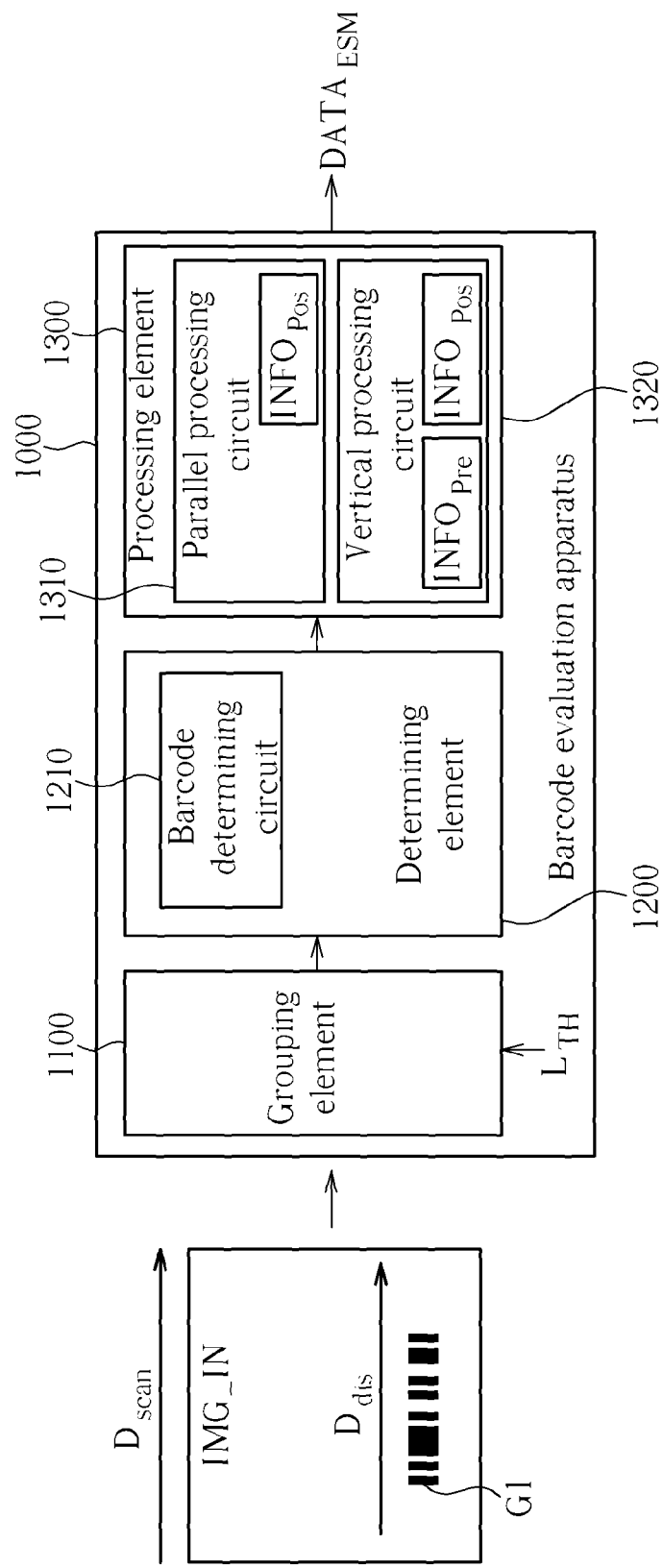
FIG. 1 is a schematic diagram of a barcode evaluation apparatus according to an embodiment of the present invention.

Please refer to FIG. 1, which is a schematic diagram of a barcode evaluation apparatus 1000 according to an embodiment of the present invention. The barcode evaluation apparatus 1000 is for receiving an input image IMG_IN, and performing an evaluation for the input image IMG_IN along a scanning direction $D_{scan}$ to generate a barcode evaluation data $DATA_{ESM}$. In this embodiment, the barcode evaluation apparatus 1000 includes (but is not limited to) a grouping element 1100, a determining element 1200 and a processing element 1300. The grouping element 1100 is for deriving a first luminance group G1 (in this case, the first luminance group G1 is a low luminance group, i.e., a black block within a barcode, however, a white block within the barcode can also be processed in other embodiments) in the input image IMG_IN according to a luminance threshold $L_{TH}$, and documenting a plurality of characteristic values (for example, a height parameter H1 and a width parameter W1, etc., of the first luminance group G1) corresponding to the first luminance group G1, respectively, wherein a configuration of the luminance threshold $L_{TH}$ can be determined by a maximum value and a minimum value of pixel luminance values of pixels within the input image IMG_IN during the barcode evaluation process; however, the luminance threshold $L_{TH}$ can also be set by a predetermined value. The grouping element 1100 can derive pixel luminance values of a plurality of pixels within the input image IMG_IN along the scanning direction $D_{scan}$. When a pixel has a pixel luminance value lower than the luminance threshold $L_{TH}$, the grouping element 1100 will categorize the pixel as a first luminance pixel (i.e., a low luminance pixel in this embodiment), and categorize a plurality of neighboring first luminance pixels as a first luminance group G1 (i.e., a low luminance group). Please note that, in this embodiment, the input image IMG_IN can be an image being printed along the scanning direction $D_{scan}$, therefore, the barcode evaluation apparatus 1000 will simultaneously process the input image IMG_IN along the scanning direction $D_{scan}$ one scanning line by one scanning line; however, the description above is not supposed to limit the scope of the present invention. The barcode evaluation apparatus 1000 can also perform barcode evaluation for a complete input image IMG_IN which has been printed already.

Figure 2:
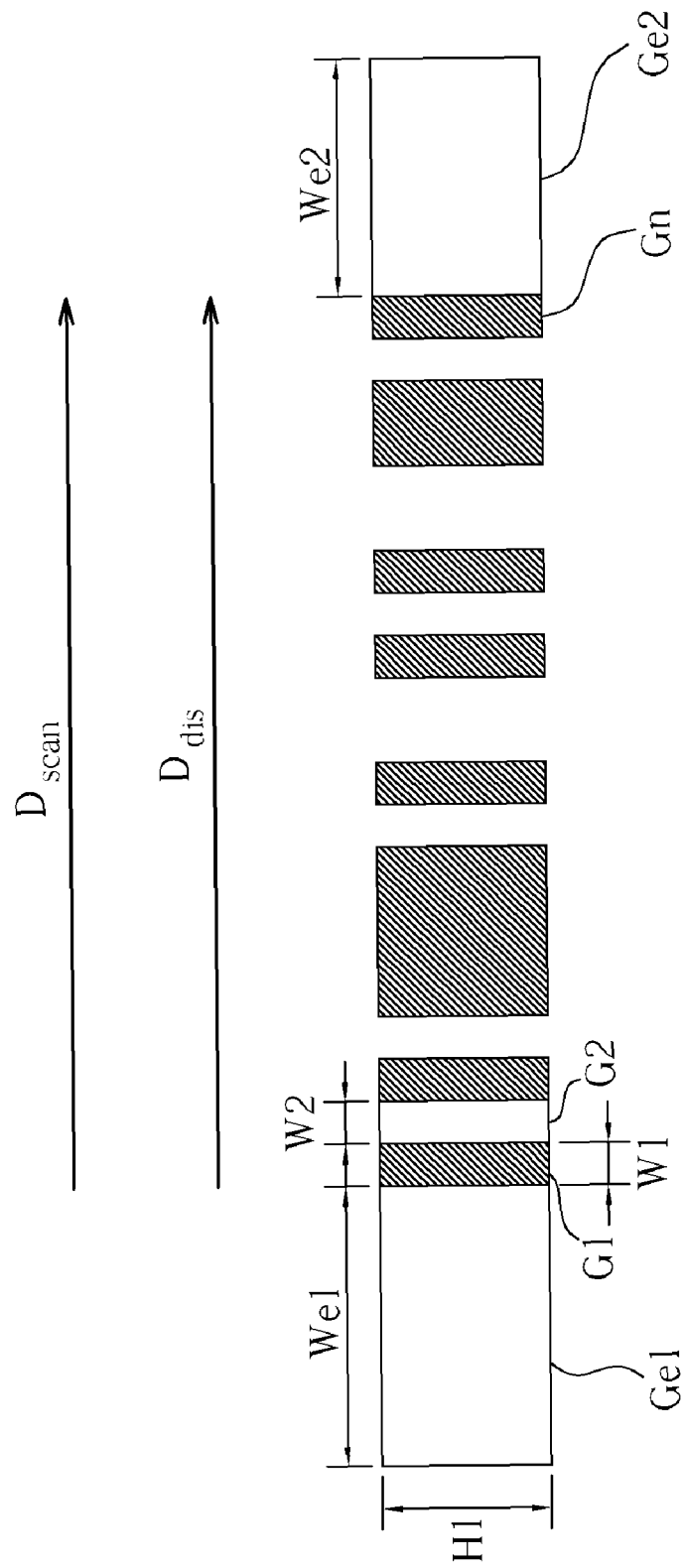
FIG. 2 is a schematic diagram of a barcode within an input image according to an embodiment of the present invention.

After deriving the first luminance group G1, the determining element 1200 will determine a relation between the distribution direction $D_{dis}$ and the scanning direction $D_{scan}$ according to the plurality of characteristic values of the first luminance group G1. For example, when the height parameter H1 of the first luminance group G1 is larger than the width parameter W1, the determining element 1200 thereby determines that the distribution direction $D_{dis}$ of the first luminance group G1 is parallel to the scanning direction $D_{scan}$; when the height parameter H1 of the first luminance group G1 is less than the width parameter W1, the determining element 1200 thereby determines that the distribution direction $D_{dis}$ of the first luminance group G1 is vertical to the scanning direction $D_{scan}$. Please refer to FIG. 2 in conjunction with FIG. 1. FIG. 2 is a schematic diagram of a barcode within the input image IMG_IN according to an embodiment of the present invention. In FIG. 2, the height parameter H1 of the first luminance group G1 is larger than the width parameter W1, therefore the determining element 1200 determines that the distribution direction $D_{dis}$ of the first luminance group G1 is parallel to the scanning direction $D_{scan}$.

The determining element 1200 then refers to a plurality of characteristic values of the first luminance group G1 and other neighboring luminance groups to determine whether the first luminance group G1 belongs to a barcode. Please refer to FIG. 2 again. In FIG. 2, the barcode contains the first luminance group G1 which has been processed by the determining element 1200, and the barcode has a distribution direction $D_{dis}$ parallel to the scanning direction $D_{scan}$ of the barcode evaluation apparatus 1000. The determining element 1200 includes a barcode determining circuit 1210 for detecting a width parameter W2 of a second luminance group G2 neighboring the first luminance group G1, and refers to the width W1 of the first luminance group G1 and a width parameter W2 of the second luminance group G2 to determine whether the first luminance group G1 belongs to the barcode. Typical barcodes have a certain restriction on a width ratio between each color block (i.e., black blocks and white clocks): for example, assuming a ratio of a width of an arbitrary black block to a width of an arbitrary white block should not be more than 4 in a given barcode specification, i.e., ¼<W1/W2<4, when a ratio W1/W2 (the width parameter W1 of the first luminance group G1 to the width parameter W2 of the second luminance group G2) is more than 4 or less than ¼, the barcode determining circuit 1210 will determine that the first luminance group G1 is not a part of a barcode. When, however, the ratio W1/W2 (the width parameter W1 of the first luminance group G1 to the width parameter W2 of the second luminance group G2) is between 4 and ¼, the barcode determining circuit 1210 determines that the first luminance group G1 is an identification bar within a barcode, and then proceeds to process the next first luminance group.

In the example in FIG. 2, the distribution direction $D_{dis}$ is parallel to the scanning direction $D_{scan}$ of the barcode evaluation apparatus 1000, i.e., evaluation apparatus 1000 will sequentially evaluate black and white blocks distributed alternately on the scanning direction $D_{scan}$. Please refer to FIG. 1 again. The processing element 1300 in FIG. 1 includes a parallel processing circuit 1310 and a vertical processing circuit 1320 for performing different evaluation according to different distribution directions; when the determining element 1300 determines that the distribution direction $D_{dis}$ is parallel to the scanning direction $D_{scan}$ the parallel processing circuit 1310 utilizes a plurality of first luminance groups (i.e., the black blocks within the barcode) of the input image IMG_IN to determine a position information $INFO_{POS}$ of the barcode, for example, the two edge identification bars of the barcode and each corner positions, etc., and utilizes the input image IMG_IN and position information $INFO_{POS}$ to determine a plurality of second luminance groups (i.e., white blocks within the barcode) between the plurality of black blocks, wherein the black blocks and the white blocks are arranged alternately in the distribution direction $D_{dis}$.

Figure 3:
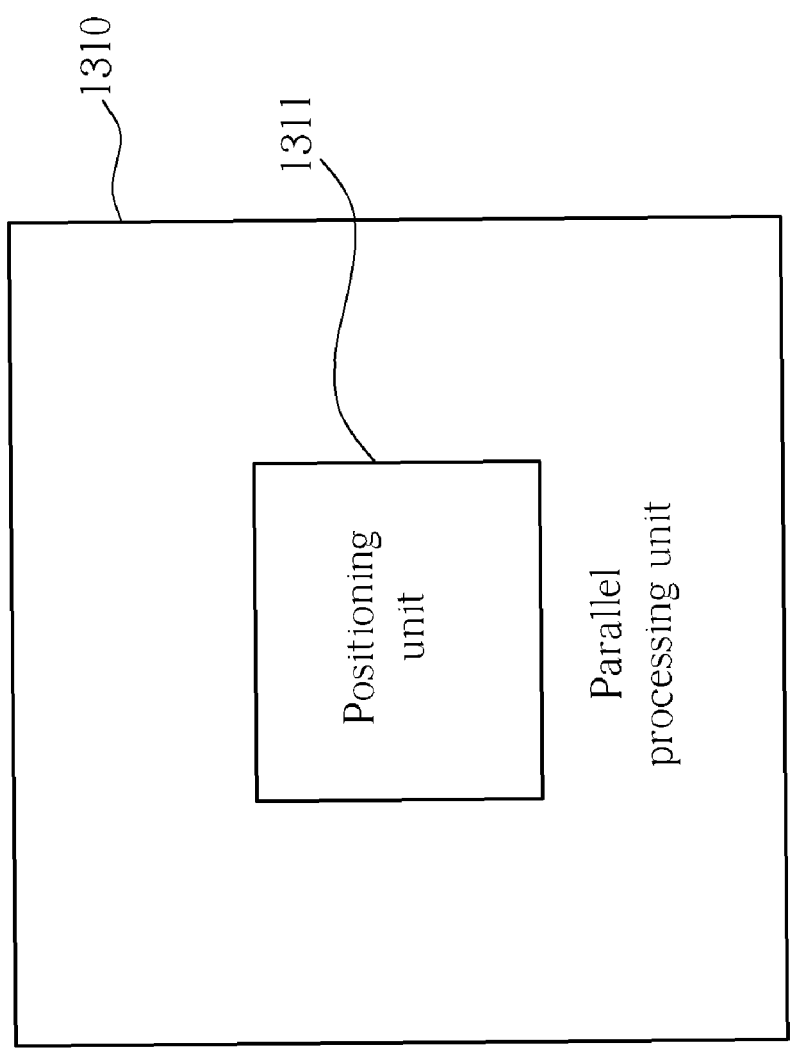
FIG. 3 is a schematic diagram of a parallel processing circuit according to an embodiment of the present invention

Please refer to FIG. 3 again. The parallel processing circuit 1310 includes a positioning unit 1311 for determining two edge groups among the plurality of first luminance groups. For convenience of identification, each barcode usually includes a dummy region at both the front and back end on the distribution direction $D_{dis}$, and the width of the dummy region is usually much larger than a multiple of a minimum identification bar width of a typical barcode specification; for example, when the minimum identification bar width of the barcode specification is $W_{min}$, there will be a dummy region of a width more than $10*W_{min}$ at each end of the barcode. Please refer to FIG. 2 again. In this embodiment, the positioning unit 1311 determines a minimum width $W_{min}$ among the first luminance groups and the second luminance groups, and then detects a width parameter We1 of a second luminance group Ge1 (i.e., a high luminance group at the front end or the back end) neighboring the first luminance group G1. When a ratio of the width parameter We1 to the minimum width $W_{min}$ is more than an edge threshold (e.g., when We1/$W_{min}$>10), the positioning unit 1311 determines the first luminance group G1 as an edge group. Similarly, the positioning unit 1311 also detects a width parameter We2 of a second luminance group Ge2 neighboring a first luminance group Gn, and determines that the first luminance group Gn is an edge group by a ratio of the width parameter We2 of a second luminance group Ge2 to the minimum width $W_{min}$. After the two edge groups G1 and Gn of the barcode are determined, the positioning unit 1311 can proceed to determine the position information $INFO_{POS}$, e.g., positions of four corners of the barcode. In this way, the barcode evaluation apparatus 1000 can choose pixel luminance around the middle part of the barcode to derive the barcode evaluation data $DATA_{ESM}$ more accurately. The parallel processing apparatus 1310 can therefore determine a plurality of first luminance groups of the barcode and a plurality of second luminance groups among the first luminance groups, choose a plurality of scanning lines around the middle part (the middle location between the upper boundary and the lower boundary) of the barcode, and document a plurality of scanning information corresponding to the plurality of scanning lines, wherein each scanning information includes quality information of the first luminance groups and the second luminance groups (for example, a reflectance, a variation of reflectance and a ripple, etc., of each black/white block), to thereby obtain the barcode evaluation data $DATA_{ESM}$ according to the plurality of scanning information.

Figure 4:
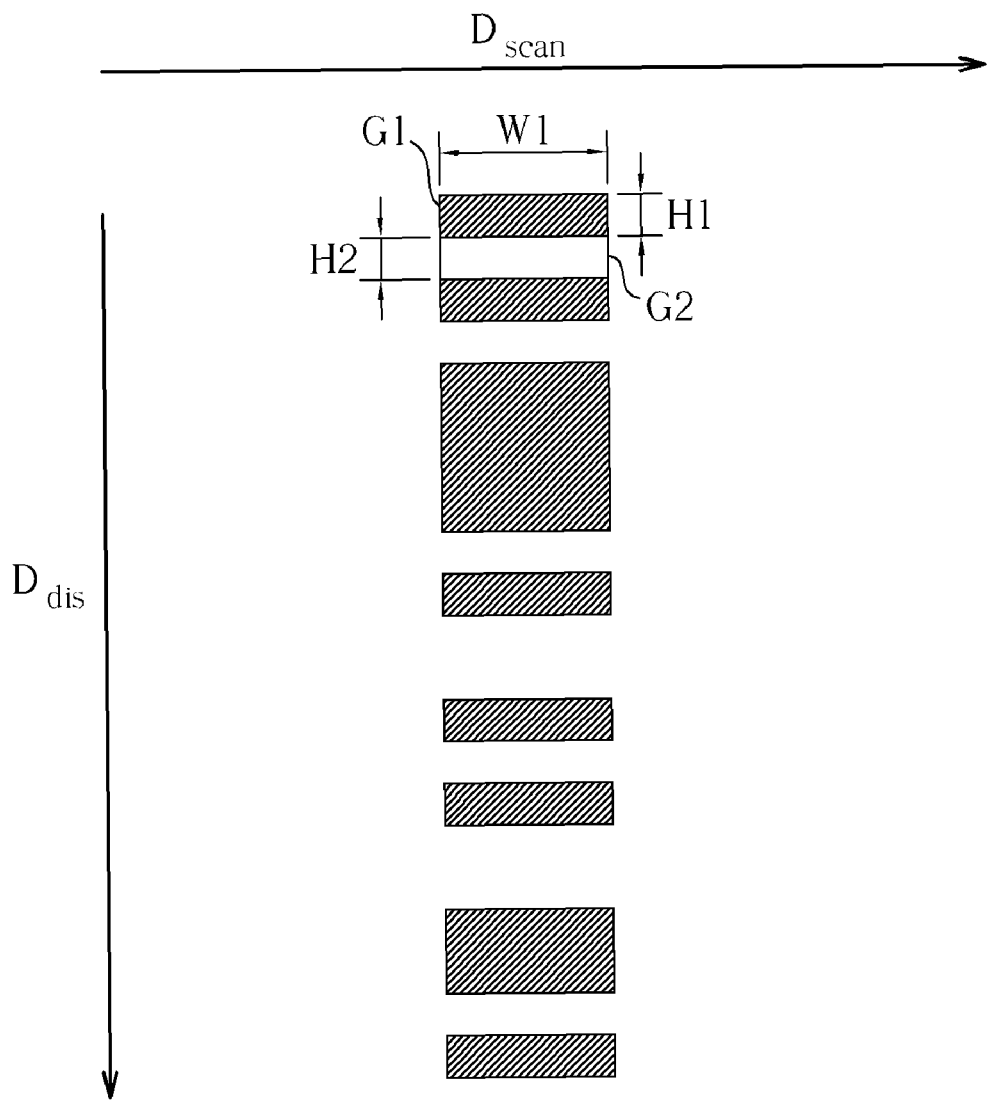
FIG. 4 is a schematic diagram of a barcode included in an input image according to another embodiment of the present invention.

The aforementioned embodiments, however, only address the operation of the barcode evaluation apparatus 1000 when the scanning direction $D_{scan}$ is parallel to the distribution direction $D_{dis}$. When the scanning direction $D_{scan}$ is vertical to the distribution direction $D_{dis}$, the barcode evaluation apparatus 1000 will perform the evaluation with different methods. Please refer to FIG. 4, which is a schematic diagram of a barcode included in the input image IMG_IN according to another embodiment of the present invention. In the example of FIG. 4, the distribution direction $D_{dis}$ of the barcode is vertical to the scanning direction $D_{scan}$ of the barcode evaluation apparatus 1000, therefore the barcode determining circuit 1210 will determine that the first luminance group is an color block within a barcode according to a height parameter H1 of the first luminance group and a height parameter H2 of the second luminance group G2. In other words, when a ratio H1/H2 (the height parameter H1 of the first luminance group to the height parameter H2 of the second luminance group G2) is between 4 and ¼, the barcode determining circuit 1210 determines that the first luminance group G1 is an identification bar within a barcode, and then go on processing the next first luminance group.

When the determining element 1200 determines that the distribution direction $D_{dis}$ of the barcode is vertical to the scanning direction $D_{scan}$, the vertical processing circuit 1320 documents a preliminary image information $INFO_{PRE}$ including the first luminance group G1 based on the input image IMG_IN, and generates the barcode evaluation data $DATA_{ESM}$ based on the preliminary image information $INFO_{PRE}$. First of all, the vertical processing circuit 1320 will utilize the preliminary image information $INFO_{PRE}$ to determine a position information $INFO_{POS}$ of the barcode from a plurality of first luminance groups (which includes the first luminance group G1), and utilize the preliminary image information $INFO_{PRE}$ and the position information $INFO_{POS}$ to determine a plurality of second luminance groups between the first luminance groups. Next, a plurality of scanning lines are chosen according to the distribution direction $D_{dis}$ and a plurality of scanning information corresponding to the first luminance groups is documented, wherein each scanning information includes quality information of the first luminance groups and the second luminance groups, and the barcode evaluation data $DATA_{ESM}$ is generated according to the scanning information.

Figure 5:
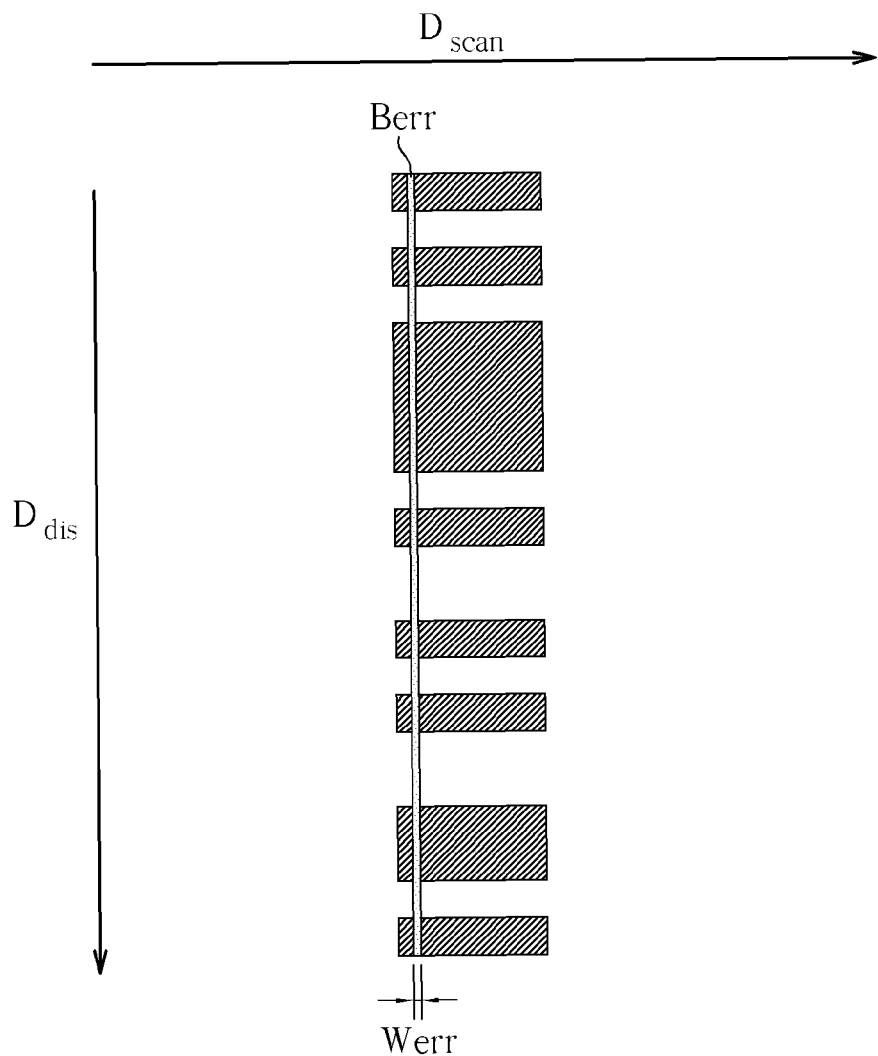
FIG. 5 is a schematic diagram of a barcode with a printing defect according to an embodiment of the present invention.
Figure 6:
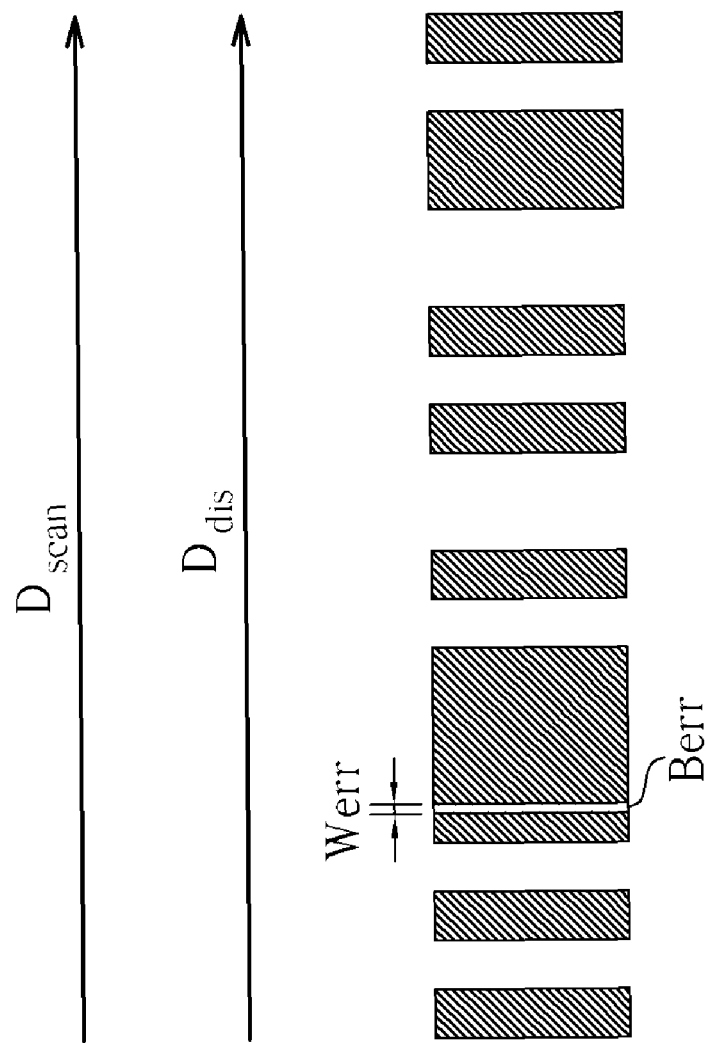
FIG. 6 is a schematic diagram of a barcode with a printing defect according to another embodiment of the present invention.

In addition, the present invention further provides a mechanism for preventing an incorrect evaluation result due to printing defects. Please refer to FIG. 5, which is a schematic diagram of a barcode with a printing defect according to an embodiment of the present invention. In FIG. 5, the distribution direction $D_{dis}$ of the barcode is vertical to the scanning direction $D_{scan}$ of the barcode evaluation apparatus 1000. When the printing machine operates inappropriately and a black block of the barcode has a lower luminance value at some part, e.g., the gray block Berr shown in FIG. 5, and all the pixels within the gray block Berr will have a luminance value less than the luminance threshold $L_{TH}$. The barcode evaluation apparatus 1000 might identify the barcode as two separated barcodes (two barcodes located at both sides of the gray block Berr). Therefore, the barcode evaluation apparatus 1000 of the present invention further includes an error tolerance mechanism to overcome the aforementioned conditions. The grouping element 1100 of the barcode evaluation apparatus 1000 will categorize a plurality of neighboring first luminance pixels as a candidate group. When a pixel luminance value of at least one specific pixel, which is located in a predetermined direction between a first candidate group and a second candidate group (for example, the scanning direction $D_{scan}$ or a direction vertical to the scanning direction $D_{scan}$) is higher than the luminance threshold $L_{TH}$, the grouping element 1100 categorizes the first candidate group, the second candidate group and the specific pixels as a first luminance group within the first luminance group, wherein the amount of the at least one specific pixel is less than a predetermined quantity k. When the amount of specific pixels, located on the predetermined direction between the first candidate group and the second candidate group and having pixel luminance values higher than the luminance threshold, is larger than the predetermined quantity k, the grouping element categorizes the first candidate group, the second candidate group and the specific pixels as two different first luminance groups within the first luminance group, respectively. In the example of FIG. 5, where the gray block Berr has a width Werr on the scanning direction $D_{scan}$ and the width Werr is smaller than a width of k pixels, the grouping element 1100 will still categorize the barcode as a whole barcode instead of two different barcodes. Please refer to FIG. 6, which is a schematic diagram of a barcode with a printing defect according to another embodiment of the present invention. In FIG. 6, the distribution direction $D_{dis}$ is parallel to the scanning direction $D_{scan}$ of the barcode evaluation apparatus 1000, and the gray block Berr has a width Werr in the scanning direction $D_{scan}$; similarly, the grouping element 1100 will still identify the two black blocks on both sides of the gray block Berr as a whole black block instead of two separated black blocks.

Figure 7:
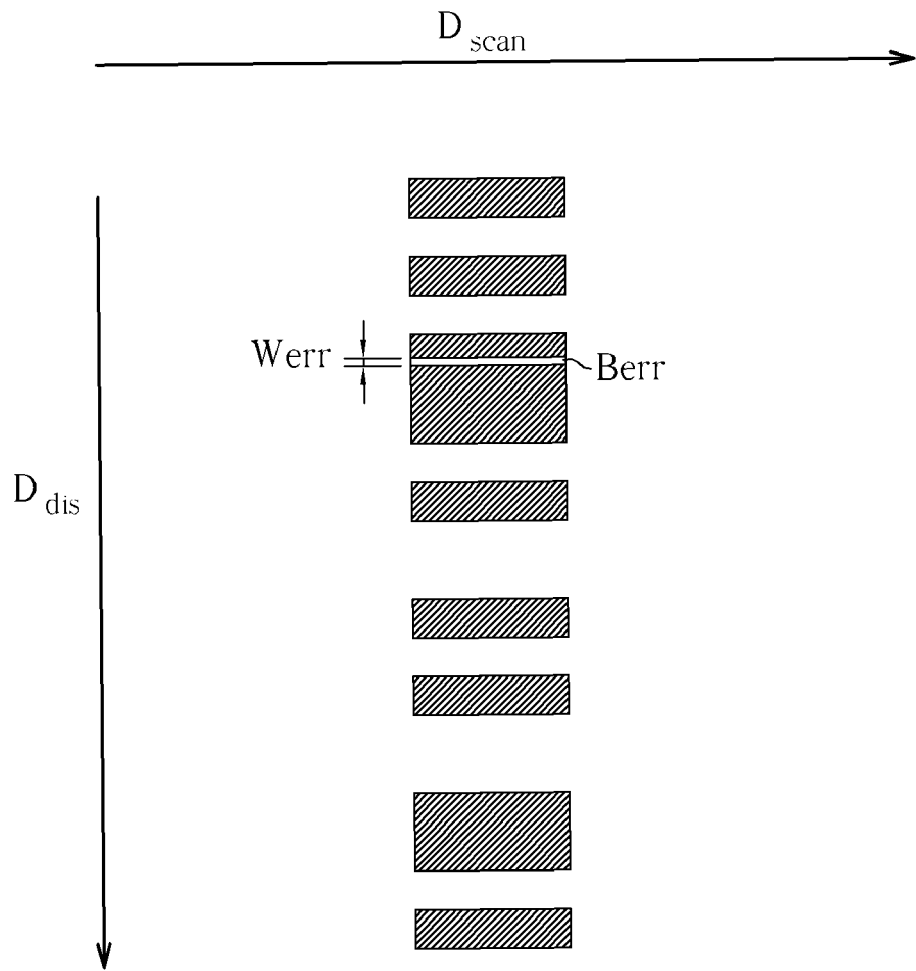
FIG. 7 is a schematic diagram of a barcode with a printing defect according to yet another embodiment of the present invention.
Figure 8:
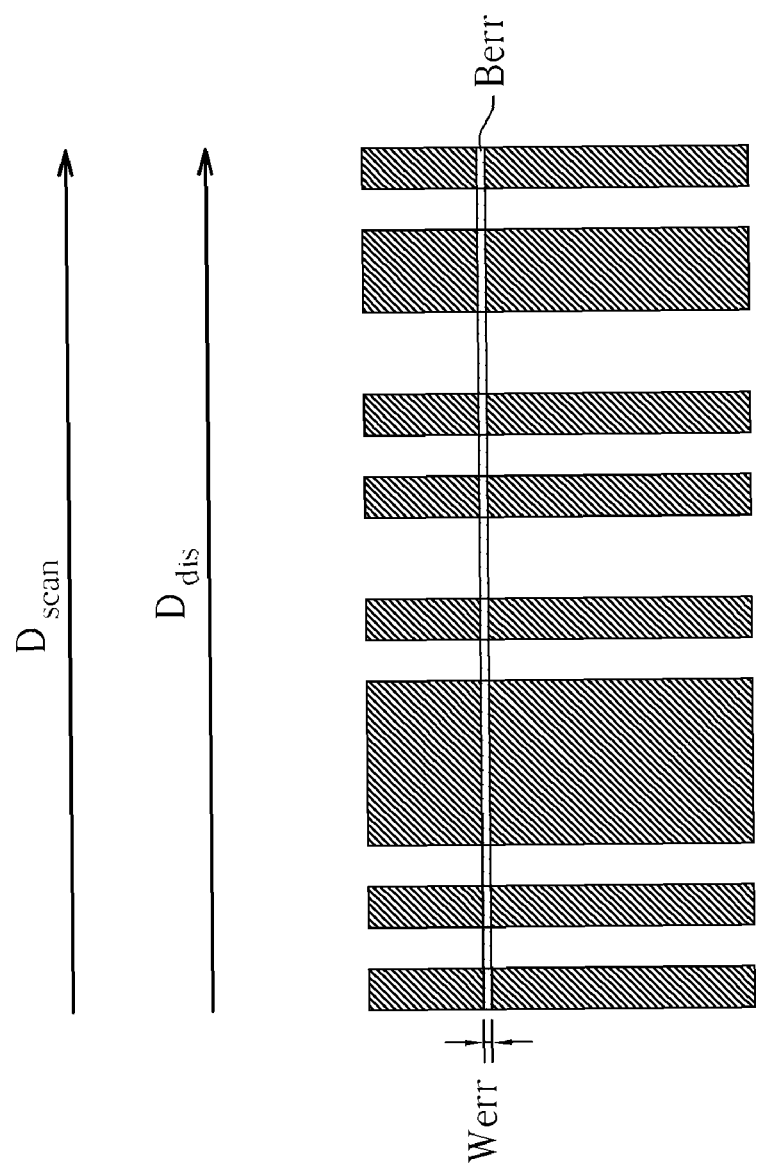
FIG. 8 is a schematic diagram of a barcode with a printing defect according to yet another embodiment of the present invention.

The printing defects in FIG. 5 and FIG. 6, i.e., the gray block Berr, have a distribution direction identical to the scanning direction $D_{scan}$ of the barcode evaluation apparatus 1000; however, this is not supposed to be a limitation of the present invention. As long as the printing defects are distributed within a predetermined range, the barcode evaluation apparatus 1000 is capable of overcoming printing defect influences and deriving correct evaluation results no matter whether the defects are distributed in the scanning direction $D_{scan}$ or in any other direction. For example, when the gray block Berr has a distribution direction parallel to the scanning direction $D_{scan}$ of the barcode evaluation apparatus 1000, the barcode evaluation apparatus 1000 can still omit the printing defects and obtain correct barcode evaluation results. Please refer to FIG. 7, which is a schematic diagram of a barcode with a printing defect according to yet another embodiment of the present invention. In FIG. 7, a distribution direction of the gray block Berr is parallel to the scanning direction $D_{scan}$ of the barcode evaluation apparatus 1000, the gray block Berr has a width Werr in a direction vertical to the scanning direction $D_{scan}$, and the width Werr is less than a width of k pixels. In this case, the grouping element 1100 will still identify the two black blocks on both sides of the gray block Berr as a whole black block instead of two separated black blocks. Similarly, please refer to FIG. 8, which is a schematic diagram of a barcode with a printing defect according to yet another embodiment of the present invention. In FIG. 8, the distribution direction of the barcode is parallel to the scanning direction $D_{scan}$ of the barcode evaluation apparatus 1000, the gray block Berr has the width Werr in a direction also parallel to the scanning direction $D_{scan}$, and the width Werr is less than a width of k pixels. In this case, the grouping element 1100 will still identify the two black blocks on both sides of the gray block Berr as a whole black block instead of two separated black blocks.

To summarize, the present invention provides a barcode evaluation method and related barcode evaluation apparatus for determining a distribution direction of a barcode within an input image and performing a proper operation based on the distribution direction to therefore derive a barcode evaluation result.

Those skilled in the art will readily observe that numerous modifications and alterations of the device and method may be made while retaining the teachings of the invention.

What is claimed is:

1. A barcode evaluation method, for receiving an input image, performing an evaluation along a scanning direction upon the input image, and generating a barcode evaluation data, comprising:

deriving at least one first luminance group in the input image according to a luminance threshold;

documenting a plurality of characteristic values corresponding to the first luminance group, respectively;

referring to a plurality of characteristic values of at least one specific first luminance group within the first luminance group to determine a distribution direction, and determining whether the at least one specific first luminance group belongs to a barcode; and utilizing a processing element to generate the barcode evaluation data according to the input image, the distribution direction and the scanning direction.

2. The barcode evaluation method of claim 1, wherein the at least one first luminance group comprises a plurality of first luminance groups; and the step of generating the barcode evaluation data according to the input image, the distribution direction and the scanning direction comprises:

when the distribution direction is parallel to the scanning direction:

utilizing the plurality of first luminance groups to determine a position information of the barcode;

utilizing the input image and the position information to determine a plurality of second luminance groups located among the plurality of first luminance groups, wherein the plurality of first luminance groups and the plurality of second luminance groups are distributed alternately;

choosing a plurality of scanning lines according to the distribution direction and documenting a plurality of scanning information corresponding to the plurality of scanning lines, wherein each scanning information comprises a plurality of quality information corresponding to the plurality of first luminance groups and the plurality of second luminance groups; and generating the barcode evaluation data according to the plurality of scanning information.

3. The barcode evaluation method of claim 2, wherein the step of utilizing the plurality of first luminance groups to determine a position information of the barcode comprises:

determining two edge groups among the plurality of first luminance groups, comprising:

determining a minimum width value among the plurality of first luminance groups and the plurality of second luminance groups;

detecting a width parameter of a specific second luminance group neighboring a specific first luminance group, determining the specific first luminance group as an edge group when a ratio of the width parameter of the specific second luminance group to the minimum width value is less than an edge threshold;

detecting a width parameter of a specific second luminance group neighboring another specific first luminance group, determining the other specific first luminance group as another edge group when a ratio of the width parameter of the other specific second luminance group to the minimum width value is less than the edge threshold; and determining the position information according to the two edge groups.

4. The barcode evaluation method of claim 1, wherein the step of generating the barcode evaluation data according to the input image, the distribution direction and the scanning direction comprises:

when the distribution direction is vertical to the scanning direction:

documenting a preliminary image data comprising the first luminance group in the input image; and generating the barcode evaluation data according to the preliminary image data.

5. The barcode evaluation method of claim 4, wherein the luminance group comprises a plurality of first luminance groups; and the step of generating the barcode evaluation data according to the preliminary image data comprises:

utilizing the plurality of first luminance groups to determine a position information of the barcode;

utilizing the preliminary image data and the position information to determine a plurality of second luminance groups located among the plurality of first luminance groups, wherein the plurality of first luminance groups and the plurality of second luminance groups are distributed alternately;

choosing a plurality of scanning lines according to the distribution direction and documenting a plurality of scanning information corresponding to the plurality of scanning lines, wherein each scanning information comprises a plurality of quality information corresponding to the plurality of first luminance groups and the plurality of second luminance groups; and generating the barcode evaluation data according to the plurality of scanning information.

6. The barcode evaluation method of claim 1, wherein the plurality of the characteristic values of the at least one first luminance group comprises a height parameter of the first luminance group and a width parameter of the at least one first luminance group.

7. The barcode evaluation method of claim 6, wherein the step of determining the distribution direction comprises:

determining that the distribution direction of barcode comprising the specific first luminance group is parallel to the scanning direction when the height parameter is larger than the width parameter; and determining that the distribution direction of barcode comprising the specific first luminance group is vertical to the scanning direction when the height parameter is smaller than the width parameter.

8. The barcode evaluation method of claim 6, wherein the step of determining whether the at least one specific first luminance group belongs to the barcode comprises:

detecting a width parameter of a specific second luminance group neighboring the at least one specific first luminance group; and referring to the width of the specific first luminance group and a width parameter of the specific second luminance group to determine whether the specific first luminance group belongs to the barcode.

9. The barcode evaluation method of claim 6, wherein the step of determining whether the at least one specific first luminance group belongs to the barcode comprises:
    detecting a height parameter of a specific second luminance group neighboring the at least one specific first luminance group; and
    referring to the height of the at least one specific first luminance group and a height parameter of the specific second luminance group to determine whether the at least one specific first luminance group belongs to the barcode.

10. The barcode evaluation method of claim 1, wherein the step of deriving at least one first luminance group in the input image according to the luminance threshold comprises:
    deriving pixel luminance values of a plurality of pixels within the input image along the scanning direction;
    categorizing a pixel as a first luminance pixel when the pixel has a pixel luminance value lower than the luminance threshold; and
    categorizing a plurality of first luminance pixels as the at least one first luminance group.

11. The barcode evaluation method of claim 10, wherein the step of categorizing the plurality of first luminance pixels as the at least one first luminance group comprises:
    categorizing a plurality of neighboring first luminance pixels as a candidate group; and
    when a pixel luminance value of at least one specific pixel, which is located on a predetermined direction between a first candidate group and a second candidate group, is higher than the luminance threshold, categorizing the first candidate group, the second candidate group and the specific pixels as a first luminance group within the at least one first luminance group, wherein amount of the specific pixel is less than a predetermined quantity; and
    when a quantity of specific pixels, which are located on a predetermined direction between a first candidate group and a second candidate group and have pixel luminance values higher than the luminance threshold, is larger than the predetermined quantity, categorizing the first candidate group, the second candidate group and the specific pixels as two different first luminance groups within the first luminance group, respectively.

12. A barcode evaluation apparatus, for receiving an input image, performing an evaluation along a scanning direction upon the input image, and generating a barcode evaluation data, the barcode evaluation apparatus comprising:
    a grouping element, coupled to the input image, for deriving at least one first luminance group in the input image according to a luminance threshold, and documenting a plurality of characteristic values corresponding to the first luminance group, respectively;
    a determining element, coupled to the grouping element, for referring to a plurality of characteristic values of the at least one specific first luminance group within the first luminance group to determine a distribution direction, and determining whether the at least one specific first luminance group belongs to a barcode; and
    a processing element, coupled to the determining element and the input image, for generating the barcode evaluation data according to the input image, the distribution direction and the scanning direction.

13. The barcode evaluation apparatus of claim 12, wherein the luminance group comprises a plurality of first luminance groups; and the processing element comprises:
    a parallel processing circuit, when the distribution direction is parallel to the scanning direction, the parallel processing circuit utilizes the plurality of first luminance groups to determine a position information of the barcode, and utilizes the input image and the position information to determine a plurality of second luminance groups located among the plurality of first luminance groups, wherein the plurality of first luminance groups and the plurality of second luminance groups are distributed alternately; the parallel processing circuit chooses a plurality of scanning line according to the distribution direction and documenting a plurality of scanning information corresponding to the plurality of scanning lines, wherein each scanning information comprises a plurality of quality information corresponding to the plurality of first luminance groups and the plurality of second luminance groups, and the parallel processing circuit generates the barcode evaluation data according to the plurality of scanning information.

14. The barcode evaluation apparatus of claim 13, wherein the parallel processing circuit comprises:
    a positioning unit, for determining two edge groups among the plurality of first luminance groups, wherein the positioning unit firstly determines a minimum width value among the plurality of first luminance groups and the plurality of second luminance groups, and detects a width parameter of a specific second luminance group neighboring a specific first luminance group, and the positioning unit determines the specific first luminance group as an edge group when a ratio of the width parameter of the specific second luminance group to the minimum width value is less than an edge threshold; and the positioning unit further detects a width parameter of a specific second luminance group neighboring another specific first luminance group, and determines the other specific first luminance group as another edge group when a ratio of the width parameter of the other specific second luminance group to the minimum width value is less than the edge threshold; and the positioning unit determines the position information according to the two edge groups.

15. The barcode evaluation apparatus of claim 12, wherein the processing element comprises:
    a vertical processing circuit, when the distribution direction is vertical to the scanning direction, the vertical processing circuit records a preliminary image data comprising the first luminance group in the input image, and generates the barcode evaluation data according to the preliminary image data.

16. The barcode evaluation apparatus of claim 15, wherein the at least one first luminance group comprises a plurality of first luminance groups, and the vertical processing circuit utilizes the plurality of first luminance groups to determine a position information of the barcode, and utilizes the preliminary image data and the position information to determine a plurality of second luminance groups located among the plurality of first luminance groups, wherein the plurality of first luminance groups and the plurality of second luminance groups are distributed alternately; the vertical processing circuit chooses a plurality of scanning lines according to the distribution direction and records a plurality of scanning information corresponding to the plurality of scanning lines, wherein each scanning information comprises a plurality of quality information corresponding to the plurality of first luminance groups and the plurality of second luminance groups, and the vertical processing circuit generates the barcode evaluation data according to the plurality of scanning information.

17. The barcode evaluation apparatus of claim 12, wherein the plurality of the characteristic values of the at least one first luminance group comprises a height parameter of the first luminance group and a width parameter of the first luminance group.

18. The barcode evaluation apparatus of claim 17, wherein the determining element determines that the distribution direction of the barcode comprising the specific first luminance group is parallel to the scanning direction when the height parameter is larger than the width parameter; and the determining element determines that the distribution direction of the barcode comprising the specific first luminance group is vertical to the scanning direction when the height parameter is smaller than the width parameter.

19. The barcode evaluation apparatus of claim 17, wherein the determining element comprises:
   a barcode determining circuit, for detecting a width parameter of a specific second luminance group neighboring the at least one specific first luminance group, and referring to the width of the at least one specific first luminance group and a width parameter of the specific second luminance group to determine whether the at least one specific first luminance group belongs to the barcode.

20. The barcode evaluation apparatus of claim 17, wherein the determining element comprises:
   a barcode determining circuit, for detecting a height parameter of a specific second luminance group neighboring the at least one specific first luminance group, and referring to the height of the specific first luminance group and a height parameter of the specific second luminance group to determine whether the at least one specific first luminance group belongs to the barcode.

21. The barcode evaluation apparatus of claim 12, wherein the grouping element derives pixel luminance values of a plurality of pixels within the input image along the scanning direction; the grouping element categorizes a pixel as a first luminance pixel when the pixel has a pixel luminance value lower than the luminance threshold; and the grouping element categorizes a plurality of first luminance pixels as the at least one first luminance group.

22. The barcode evaluation apparatus of claim 21, wherein the grouping element categorizes a plurality of neighboring first luminance pixels as a candidate group, when a pixel luminance value of at least one specific pixel, which is located on a predetermined direction between a first candidate group and a second candidate group, is higher than the luminance threshold, the grouping element categorizes the first candidate group, the second candidate group and the specific pixels as a first luminance group within the first luminance group, wherein a quantity of the specific pixel is less than a predetermined quantity; when a quantity of specific pixels, which are located on the predetermined direction between the first candidate group and the second candidate group and have pixel luminance values higher than the luminance threshold, is larger than the predetermined quantity, the grouping element categorizes the first candidate group, the second candidate group and the specific pixels as two different first luminance groups within the at least one first luminance group, respectively.

\* \* \* \* \*